US012545567B2

(12) United States Patent
Liou

(10) Patent No.: US 12,545,567 B2
(45) Date of Patent: Feb. 10, 2026

(54) DUAL-HEADED PRY TOOL WITH ROTATABLE HEAD

(71) Applicant: Tang Chou Industrial Co., Ltd., Nantou County (TW)

(72) Inventor: Mou-Tang Liou, Taichung (TW)

(73) Assignee: TANG CHOU INDUSTRIAL CO., LTD., Nantou County (TW)

( * ) Notice: Subject to any disclaimer, the term of this patent is extended or adjusted under 35 U.S.C. 154(b) by 343 days.

(21) Appl. No.: 18/341,888

(22) Filed: Jun. 27, 2023

(65) Prior Publication Data

US 2025/0002314 A1 Jan. 2, 2025

(51) Int. Cl.
*B66F 15/00* (2006.01)

(52) U.S. Cl.
CPC .................................... *B66F 15/00* (2013.01)

(58) Field of Classification Search
CPC ....................................................... B66F 15/00
See application file for complete search history.

(56) References Cited

U.S. PATENT DOCUMENTS 856,097 A * 6/1907 Palmer ................... B25D 1/045 254/26 E
3,118,696 A * 1/1964 Resare ................ B25B 23/0035 81/177.85
6,578,820 B1 * 6/2003 Turman .................... B25C 9/00 254/20
6,715,380 B2 * 4/2004 Listl ...................... B25B 23/141 81/57.13
7,434,785 B1 * 10/2008 McMorrow ............ A62B 3/005 254/134
7,574,946 B1 * 8/2009 Chang ..................... B25B 23/12 81/177.85
8,201,806 B2 * 6/2012 Liou ........................ B25G 3/26 254/27
8,708,312 B2 * 4/2014 Stawarski ............... B66F 15/00 254/129
11,801,595 B2 * 10/2023 Liou ........................ B25G 1/04
2010/0127226 A1 * 5/2010 Smith ..................... E04G 23/08 254/27
2019/0084817 A1 * 3/2019 Zhang ..................... B25C 11/00
2025/0002314 A1 * 1/2025 Liou ....................... B66F 15/00

FOREIGN PATENT DOCUMENTS

TW M310787 U 5/2007

* cited by examiner

*Primary Examiner* — Lee D Wilson
(74) *Attorney, Agent, or Firm* — MUNCY, GEISSLER, OLDS & LOWE, P.C.

(57) ABSTRACT

A dual-headed pry tool with rotatable head includes a first tool component provided with a first tool head and a first pivot connection, and a second tool component provided with a second tool head and a second pivot connection. The second pivot connection is pivotally connected to the first pivot connection. The second tool component is rotatable relative to the first tool component about a pivot axis which extends along a longitudinal direction of the first tool component. Each of the first and the second tool heads has an orientation with respect to the pivot axis, and a relative angle between the orientations of the first and the second tool heads changes as the second tool component rotates relative to the first tool component.

12 Claims, 7 Drawing Sheets

DUAL-HEADED PRY TOOL WITH ROTATABLE HEAD

BACKGROUND OF THE INVENTION

The present invention relates to a pry tool with dual heads and, more particularly, the head is rotatable to various angular orientations.

Taiwan Pat. No. M310787 discloses a structure-improved pry tool. The pry tool includes an elongated shaft and two claws. The shaft is hollow and has a slightly flat cross section. The two claws are solid. A first claw is coupled to a first of two ends of the shaft. The first claw includes a fix end inserted in the hollow of the shaft and welded to the first end of the shaft. A second claw is coupled to a second of the two ends of the shaft. The second claw includes a fix end inserted in the hollow of the shaft and welded to the second end of the shaft.

When using such pry tool, users often use one hand to grip on the claw not used in order to apply force efficiently. The users, however, are easily scratched by the flat and sharp corners of the claw.

The present invention is, therefore, intended to obviate or at least alleviate the problems encountered in the prior art.

SUMMARY OF THE INVENTION

A dual-headed pry tool with rotatable head includes a first tool component provided with a first tool head useful for prying objects at a first end thereof and a first pivot connection at a second end thereof respectively, and a second tool component provided with a second tool head useful for prying objects at a first end thereof and a second pivot connection at a second end thereof respectively. The second pivot connection is pivotally connected to the first pivot connection to allow the first and the second tool components to pivotally connect with each other. The second tool component is rotatable relative to the first tool component about a pivot axis which extends along a longitudinal direction between the first and the second ends of the first tool component. Each of the first and the second tool heads has an orientation with respect to the pivot axis, and a relative angle between the orientations of the first and the second tool heads changes as the second tool component rotates relative to the first tool component.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
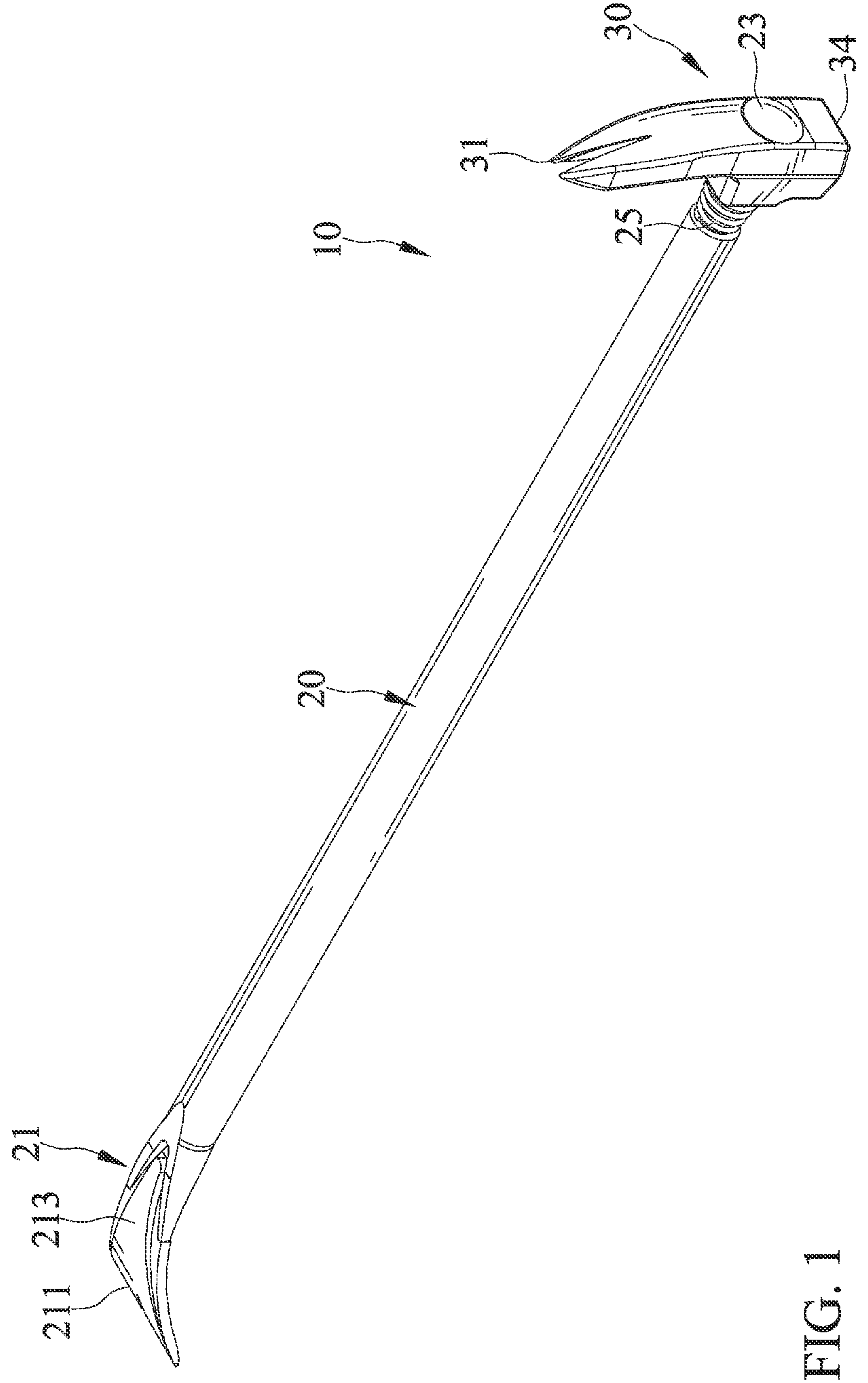
FIG. 1 is a perspective view of a dual-headed pry tool with rotatable head according to the present invention.
Figure 2:
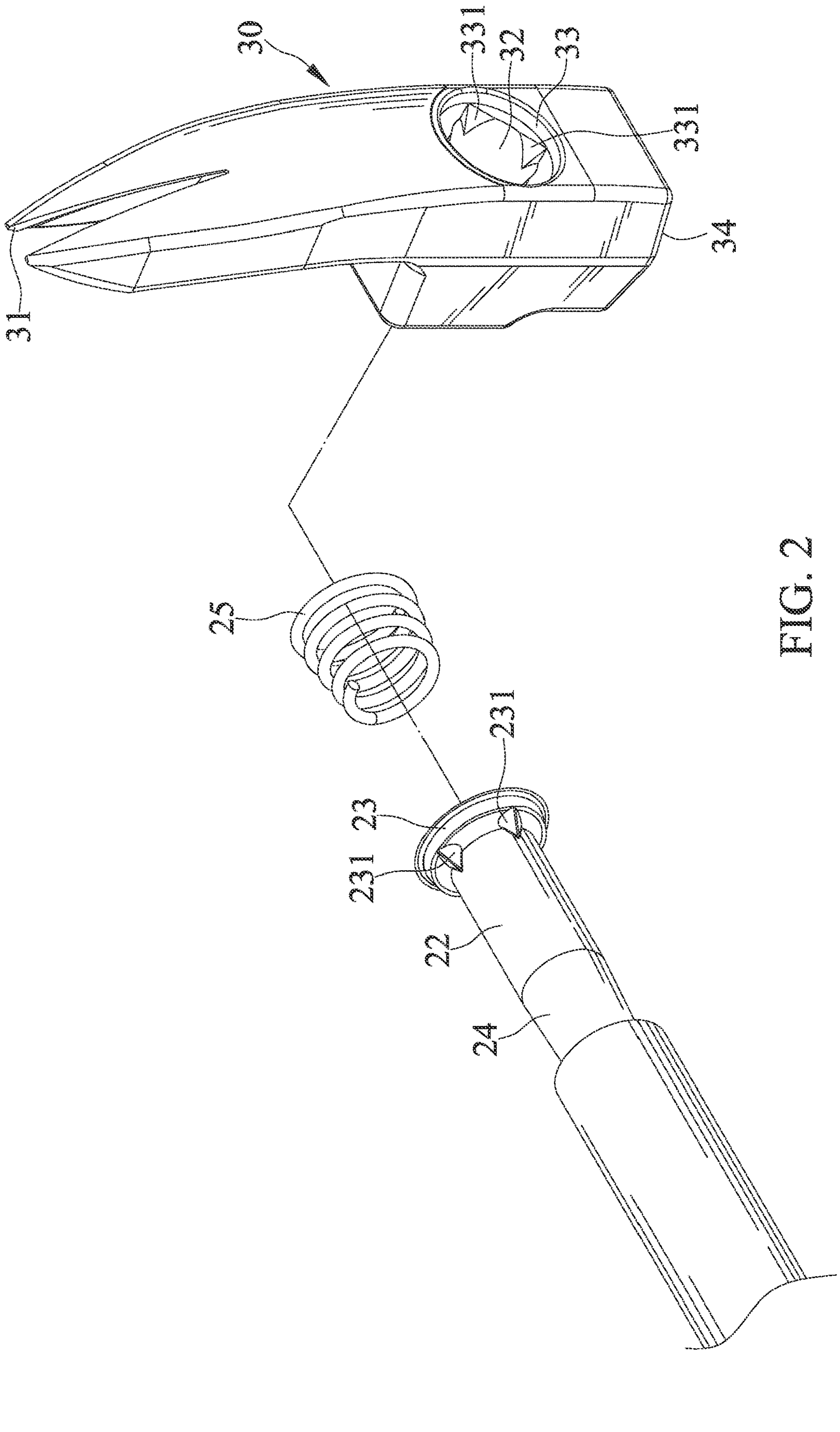
FIG. 2 is an exploded perspective view of a rotatable head of the dual-headed pry tool of FIG. 1.
Figure 3:
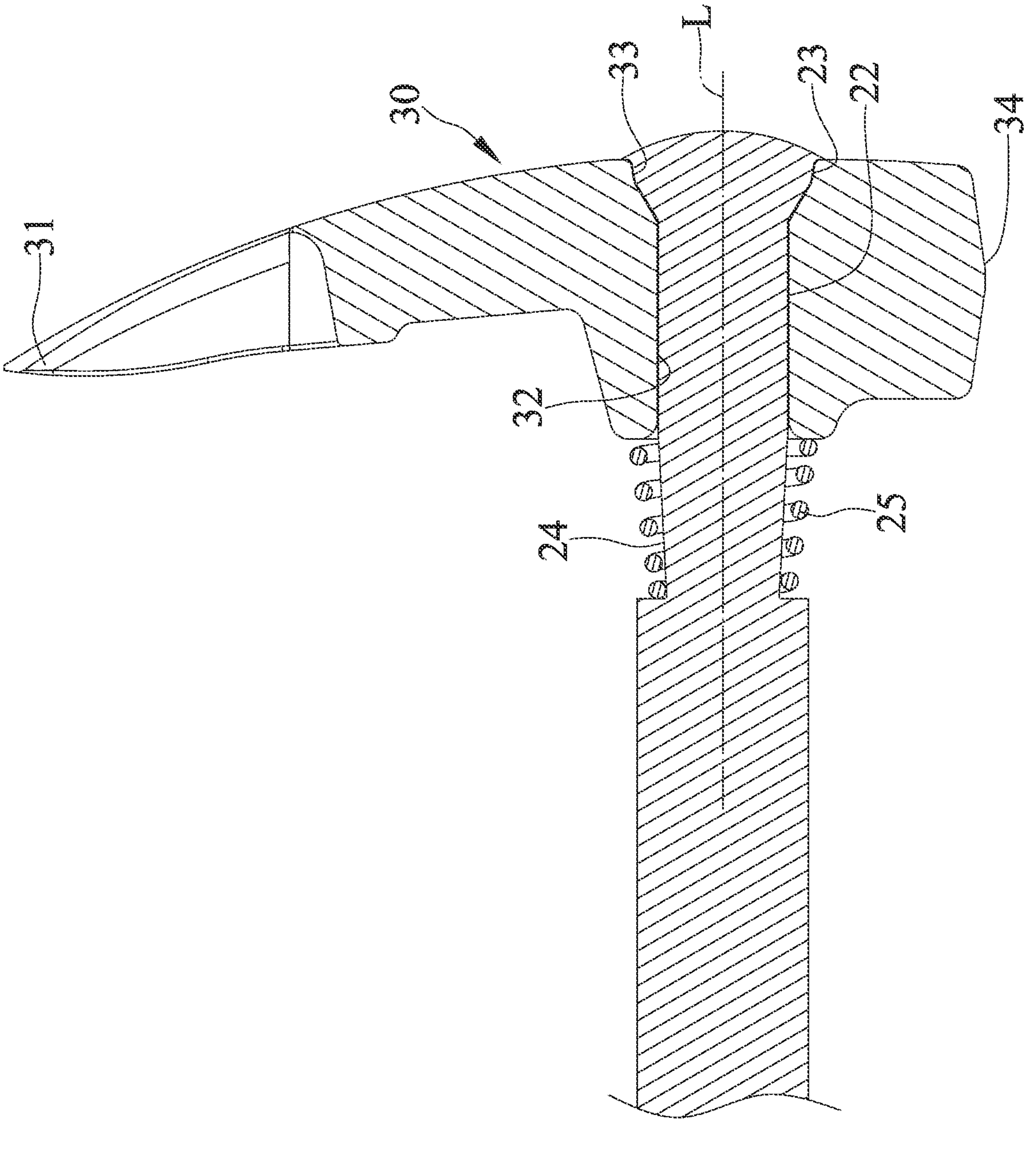
FIG. 3 is a cross-sectional view of the dual-headed pry tool of FIG. 1 and shows the rotatable head in a first orientation.
Figure 4:
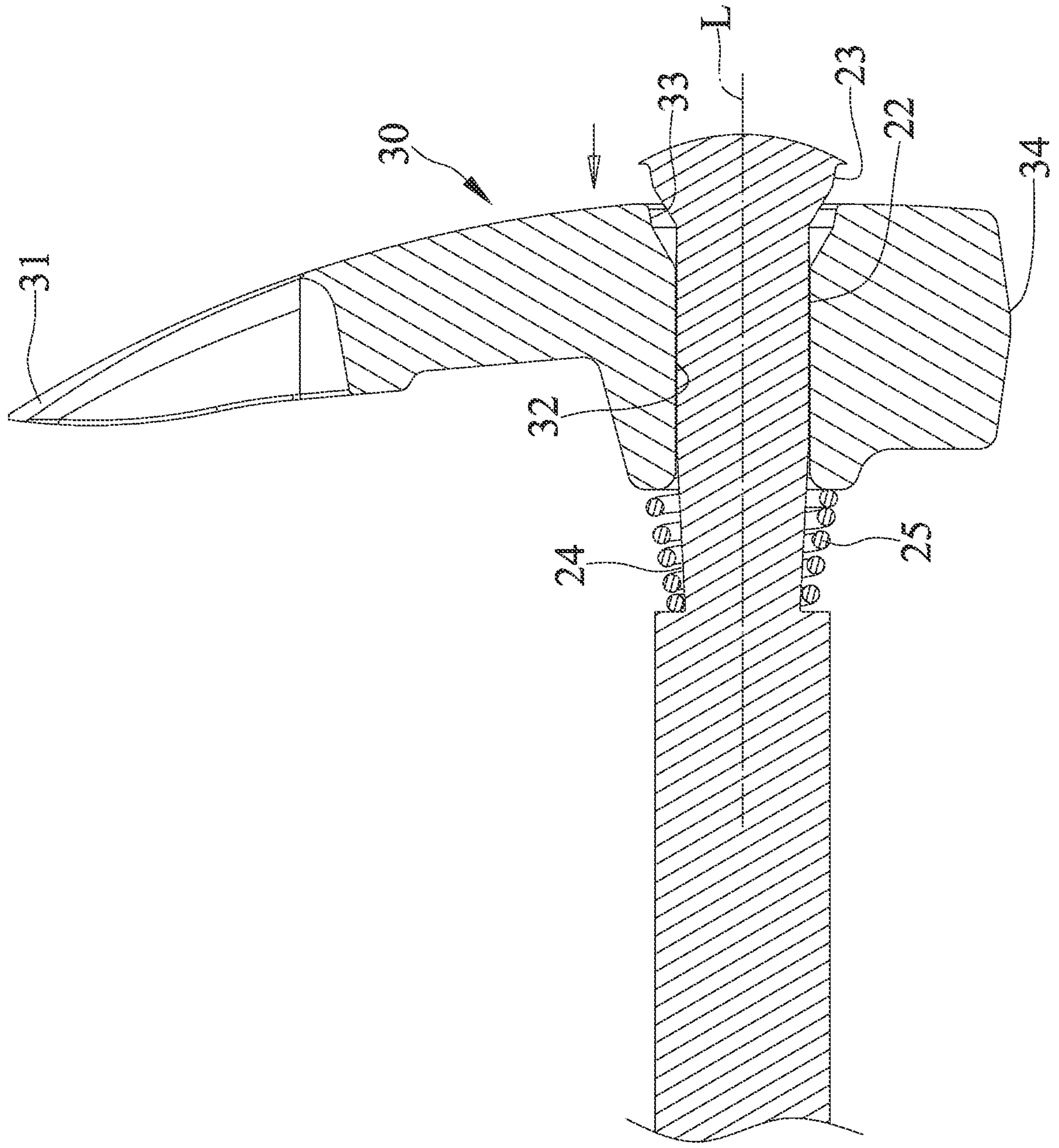
FIG. 4 is a cross-sectional view of the dual-headed pry tool of FIG. 1 and shows the rotatable head in an unlocked position.
Figure 5:
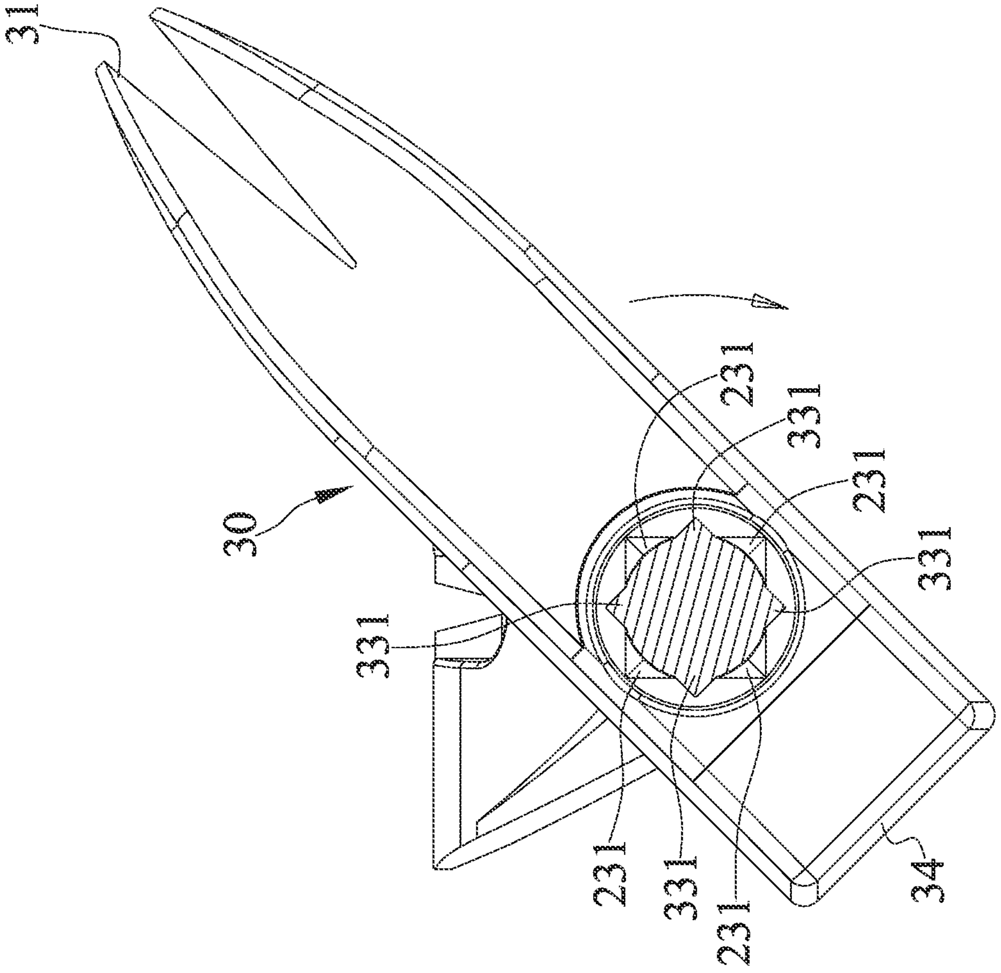
FIG. 5 is a side view of the dual-headed pry tool of FIG. 1 and illustrates the operation of the rotatable head after being unlocked.
Figure 6:
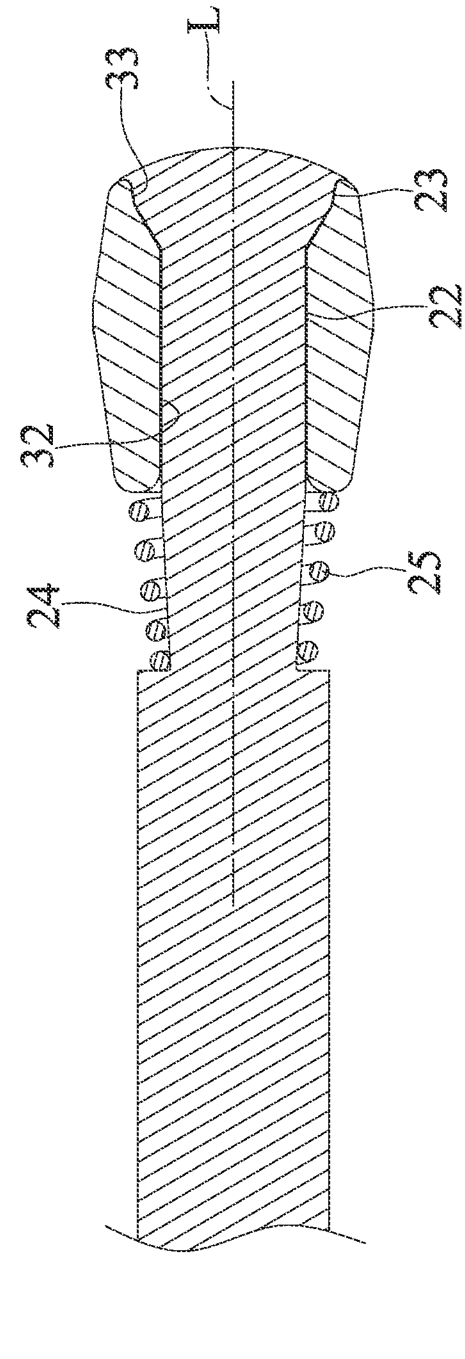
FIG. 6 is a cross-sectional view of the dual-headed pry tool of FIG. 1 and shows the rotatable head in a second orientation.
Figure 7:
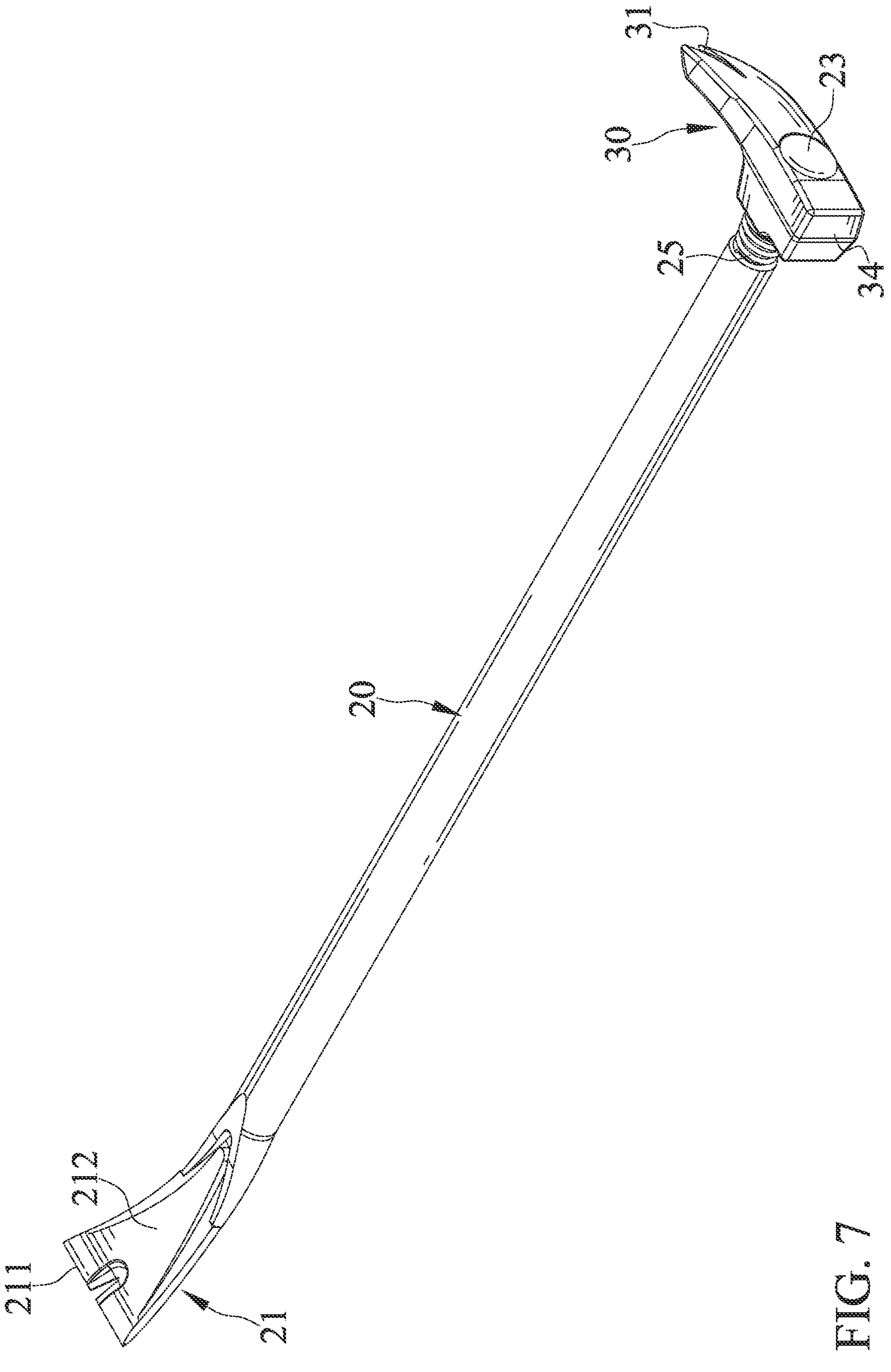
FIG. 7 is a perspective view of the dual-headed pry tool of FIG. 1 and shows the rotatable head in the second orientation.

FIGS. 1-7 show a dual-headed pry tool 10 with rotatable head according to the present invention. The dual-headed pry tool 10 includes a first tool component 20 and a second tool component 30 coupled with each other.

The first tool component 20 is provided with a first tool head 21 useful for prying objects at a first end thereof and a first pivot connection 22 at a second end thereof respectively. The first tool component 20 forms a shaft useful as a lever interconnecting the first tool head 21 and the first pivot connection 22. In the embodiment, the shaft is solid but can be hollow. The first tool head 21 is provided with an edge 211 at a distal end thereof which extends along a straight line, a pulling surface 212 at a first surface thereof configured to bear an object to be pried, and a supporting surface 213 at a second surface thereof, which is opposite the first surface, configured to abut against a surface to be pulled apart from the object to be pried. The edge 211 of the first tool head 21 is notched that is adapted for engaging with a nail to be pried. The pulling and the supporting surfaces 212 and 213 extend oppositely from the edge 211. The pulling surface 212 is concave. The supporting surface 213 is convex.

The second tool component 30 is provided with a second tool head 31 useful for prying objects at a first end thereof and a second pivot connection 32 at a second end thereof respectively. The second tool head 31 forms a claw. The second tool head 31 is notched that is adapted for engaging with a nail to be pried. The second pivot connection 32 is pivotally connected to the first pivot connection 22 to allow the first and the second tool components 20 and 30 to pivotally connect with each other. The second pivot connection 32 is provided with a hole. The second tool component 30 is rotatable relative to the first tool component 20 about a pivot axis L which extends along a longitudinal direction between the first and the second ends of the first tool component 20. Each of the first and the second tool heads 21 and 31 has an orientation with respect to the pivot axis L, and a relative angle between the orientations of the first and the second tool heads 21 and 31 changes as the second tool component 30 rotates relative to the first tool component 20.

The second tool component 30 is further provided a third tool head 34 at a third end thereof. The third tool head 34 forms a mallet that is adapted to hammer an object.

The dual-headed pry tool 10 further includes mechanisms to selectively prevent a relative pivotal movement between the first and the second tool components 20 and 30. The first tool component 20 is provided with a first restraining portion 23 and the second tool component 30 is provided with a second restraining portion 33 respectively. The first restraining portion 23 is adjacent to the first pivot connection 22. The second restraining portion 33 is adjacent to the second pivot connection 32. The first restraining portion 23 is shaped from an end of the first pivot connection 22 and deforms into a shape matching the second restraining portion 33. The first and the second restraining portions 23 and 33 are selectively engaged with each other to restrain the second tool component 30 from rotating relative to the first tool component 20. The second pivot connection 32 is also movably connected to the first pivot connection 22 to allow the first and the second tool components 20 and 30 to moveably connect with each other. The second tool component 30 is axially moveable relative to the first tool component 20 between a first position in which the first and the second restraining portions 23 and 33 engage with each other and a second position in which the first and the second restraining portions 23 and 33 disengage from each other. When the second tool component 30 is in the first position, i.e., locked position, it can't rotate relative to the first tool component 20. Moreover, when the second tool component 30 is in the second position, i.e. unlocked position, it can rotate about the pivot axis L relative to the first tool component 20. One of the first and the second restraining portions 23 and 33 is provided with at least one protrusion 231 and the other of the first and the second restraining portions 23 and 33 is provided with at least one fitting groove 331 corresponding to the at least one protrusion 231. When the second tool component 30 is in the first position, the at least one protrusion 231 is engaged in the at least one fitting groove 331. When the second tool component 30 is in the second position, the at least one protrusion 231 is disengaged from the at least one fitting groove 331. In the embodiment, the at least one protrusion 231 includes a plurality of protrusions which are arranged circumferentially around the pivot axis L and spaced evenly from one another, the at least one fitting groove 331 includes a plurality of fitting grooves which are arranged circumferentially around the pivot axis L and spaced evenly from one another, and the quantity of the plurality of protrusions and the quantity of the plurality of grooves correspond with each other. In the embodiment, when the second tool component 30 can't rotate relative to the first tool component 20, the four protrusions engage in the four fitting grooves. Moreover, when the second tool component 30 can rotate relative to the first tool component 20, the four protrusions disengage from the four fitting grooves.

Further, the first tool component 20 is provided with a compressible member receiving portion 24 adjacent to the first pivot connection 22 and disposed between the shaft and the first pivot connection 22. The first pivot connection 22 and the compressible member receiving portion 24 are solid but can be hollow. The compressible member receiving portion 24 includes a resilient member 25 disposed thereon. The resilient member 25 is fit outside and circumferentially surrounds the compressible member receiving portion 24. The resilient member 25 forms a conical spring which has a large diameter end and a small diameter end. The small diameter end abuts against the first tool component 20 and the large diameter end abuts against the second tool component 30 respectively. The compressible member receiving portion 24 has a conical shape which has a large diameter end corresponding to and supporting the large diameter end of the resilient member 25 and a small diameter end corresponding to and supporting the small diameter end of the resilient member 25. The large diameter end of the compressible member receiving portion 24 is adjacent to the first pivot connection 22 and the small diameter end of the compressible member receiving portion 24 is distal to the first pivot connection 22 respectively. The second tool component 30 is urged by a resilient member 25 and selectively connects and disconnects with the compressible member receiving portion 24. When the second tool component 30 is in the first position, it is disconnected with the compressible member receiving portion 24. When the second tool component 30 is in the second position, it is connected with the compressible member receiving portion 24.

In view of the foregoing, a user can grip on the first tool component 20 to exert force, especially on the position close to the first tool head 21 in order to apply force more efficiently, and when using the second tool head 31 to pry an object, the second tool component 30 can be rotated to an orientation in which the second tool head 31 faces opposite a downward facing direction of the pulling surface 212 of the first tool head 21 (as shown in FIG. 1), the user can thus press on the supporting surface 213 in order to output force more efficiently and will not touch the edge 211 during the operation. On the other hand, the user does not need to worry about being scratched by the edge 211.

Further, the first restraining portion 23, which is integrally formed with the first pivot connection 22, can not only limits the rotation of the second tool component 30 with respect to the first tool component 20 but also provides a locking effect therebetween. In other words, unlike traditional fixing methods, the second tool component 30 is prevented from detaching from the first tool component 20.

Although specific embodiments have been illustrated and described, numerous modifications and variations are still possible without departing from the scope of the invention. The scope of the invention is limited by the accompanying claims.

The invention claimed is:

1. A dual-headed pry tool with rotatable head comprising:

a first tool component provided with a first tool head useful for prying objects at a first end thereof and a first pivot connection at a second end thereof respectively, wherein the first tool head is provided with an edge at a distal end thereof and a pulling surface configured to bear an object to be pried, wherein the first tool component is provided with a first restraining portion adjacent to the first pivot connection, wherein the first restraining portion is provided with at least one protrusion, wherein the first tool component is provided with a compressible member receiving portion disposed between the first tool head and the first pivot connection, and wherein the compressible member receiving portion includes a resilient member disposed thereon and circumferentially surrounding the compressible member receiving portion; and a second tool component provided with a second tool head useful for prying objects at a first end thereof and a second pivot connection at a second end thereof respectively, wherein the second tool component is provided with a second restraining portion adjacent to the second pivot connection, wherein the second restraining portion is provided with at least one fitting groove corresponding to the at least one protrusion, wherein the second pivot connection is pivotally connected to the first pivot connection to allow the first and the second tool components to pivotally connect with each other, wherein the second tool component is rotatable relative to the first tool component about a pivot axis which extends along a longitudinal direction between the first and the second ends of the first tool component, and wherein each of the first and the second tool heads has an orientation with respect to the pivot axis, and a relative angle between the orientations of the first and the second tool heads changes as the second tool component rotates relative to the first tool component, wherein the first and the second restraining portions are selectively engaged with each other to restrain the second tool component from rotating relative to the first tool component, and wherein the second tool component is axially moveable relative to the first tool component between a first position in which the at least one protrusion is engaged in the at least one fitting groove and a second position in which the at least one protrusion is disengaged from the at least one fitting groove; and wherein the second tool component is urged by the resilient member and selectively connects and disconnects with the compressible member receiving portion.

2. The double-headed prying tool with rotatable head as claimed in claim 1, wherein the at least one protrusion includes a plurality of protrusions which are arranged circumferentially around the pivot axis and spaced evenly from one another, wherein the at least one fitting groove includes a plurality of fitting grooves which are arranged circumferentially around the pivot axis and spaced evenly from one another, and wherein the quantity of the plurality of protrusions and the quantity of the plurality of grooves correspond with each other.

3. The double-headed prying tool with rotatable head as claimed in claim 2, wherein the resilient member forms a conical spring which has a large diameter end and a small diameter end, and wherein the small diameter end abuts against the first tool component and the large diameter end abuts against the second tool component respectively.

4. The double-headed prying tool with rotatable head as claimed in claim 1, wherein the compressible member receiving portion has a conical shape which has a large diameter end and a small diameter end, and wherein the large diameter end is adjacent to the first pivot connection and the small diameter end distal to the first pivot connection respectively.

5. The double-headed prying tool with rotatable head as claimed in claim 3, wherein the compressible member receiving portion has a conical shape which has a large diameter end corresponding to and supporting the large diameter end of the resilient member and a small diameter end corresponding to and supporting the small diameter end of the resilient member, and wherein the large diameter end of the compressible member receiving portion is adjacent to the first pivot connection and the small diameter end of the compressible member receiving portion is distal to the first pivot connection respectively.

6. The double-headed prying tool with rotatable head as claimed in claim 1, wherein the first tool head is provided with a supporting surface configured to abut against a surface to be pulled apart from the object to be pried, and wherein the pulling and the supporting surfaces extend oppositely from the edge.

7. The double-headed prying tool with rotatable head as claimed in claim 6, wherein the pulling surface is concave, and wherein the supporting surface is convex.

8. The double-headed prying tool with rotatable head as claimed in claim 6, wherein the edge of the first tool head is notched.

9. The dual-headed pry tool with rotatable head as claimed in claim 7, wherein the second tool head forms a claw.

10. The dual-headed pry tool with rotatable head as claimed in claim 9, wherein the second tool head is notched.

11. The dual-headed pry tool with rotatable head as claimed in claim 1, wherein the second tool component is provided a third tool head at a third end thereof, and wherein the third tool head forms a mallet.

12. The dual-headed pry tool with rotatable head as claimed in claim 1, wherein the first pivot connection is cylindrical.

* * * * *